Nov. 22, 1927.

H. I. MORRIS

STRIPPING MACHINE

Filed June 9, 1924

INVENTOR
Howard I. Morris
BY
ATTORNEY

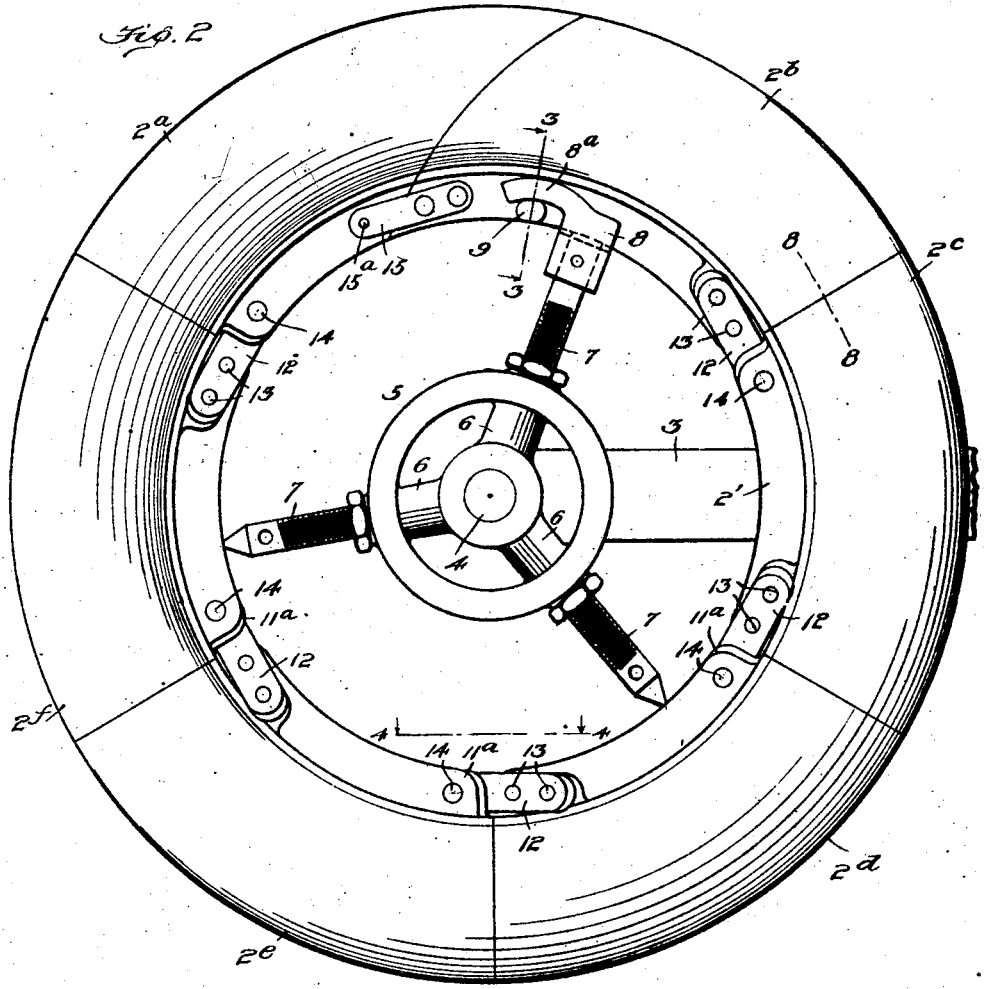
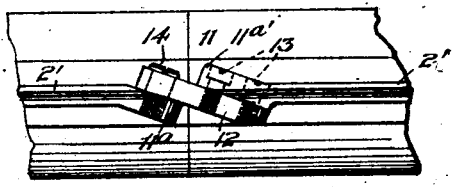
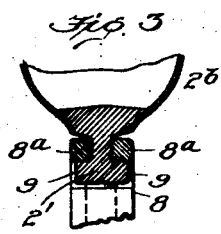

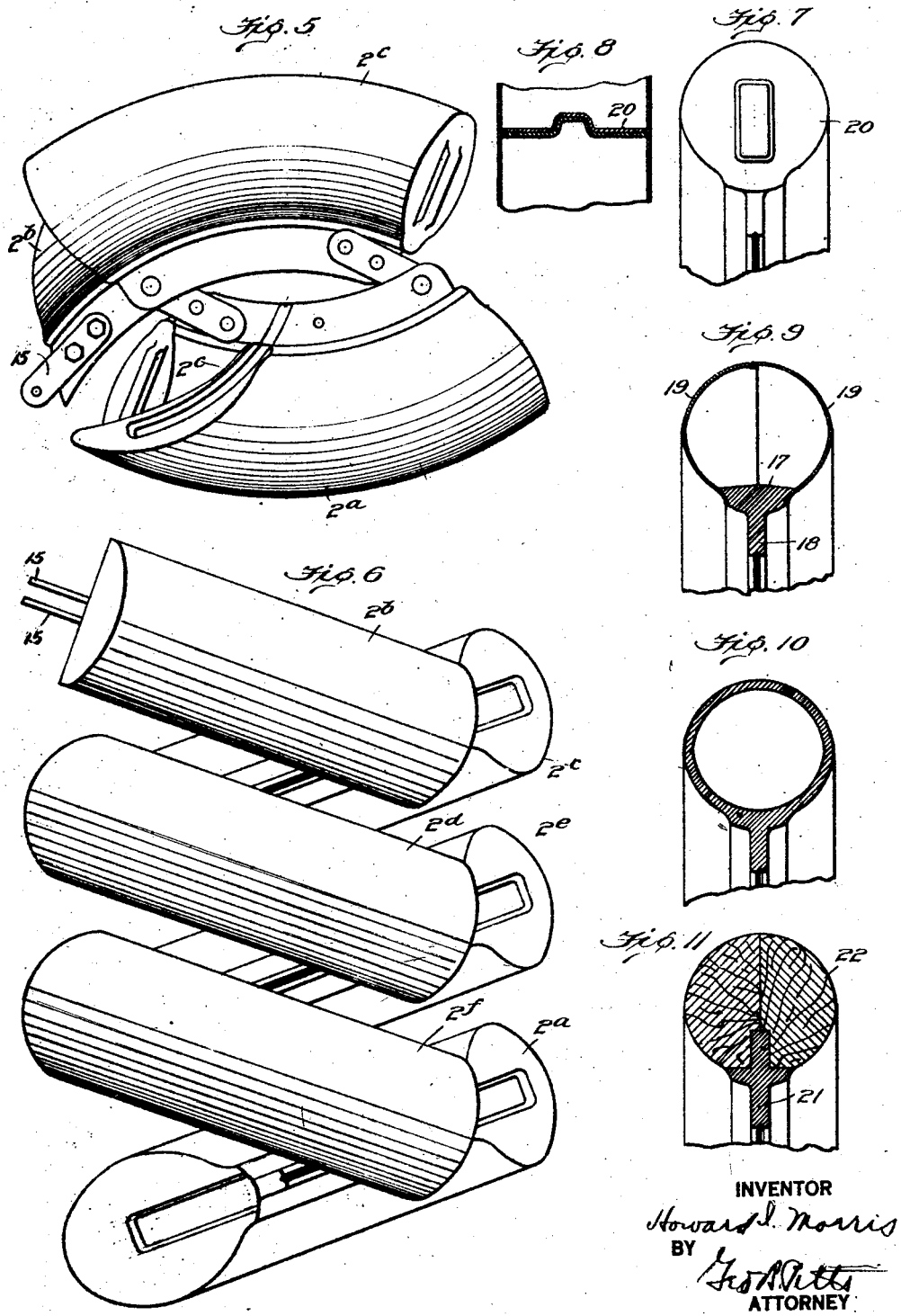

Nov. 22, 1927.
H. I. MORRIS
STRIPPING MACHINE
Filed June 9, 1924
1,650,147
5 Sheets-Sheet 4
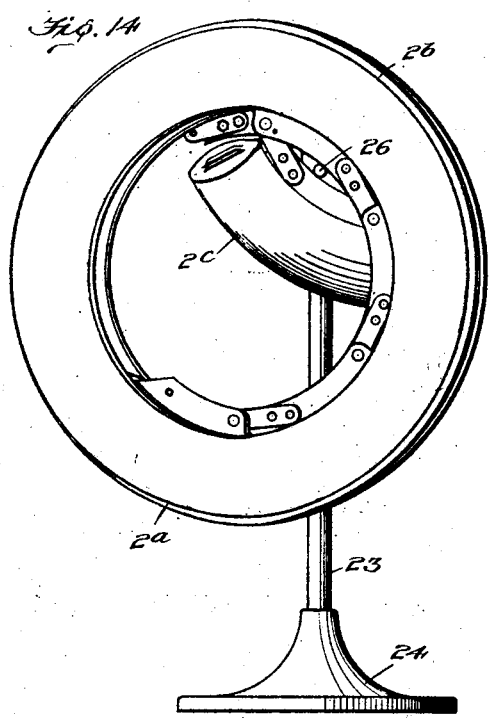
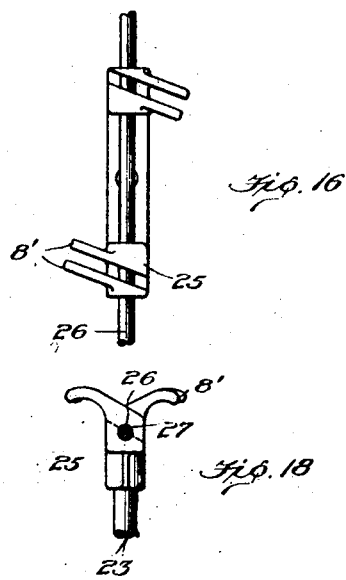
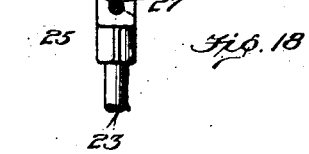
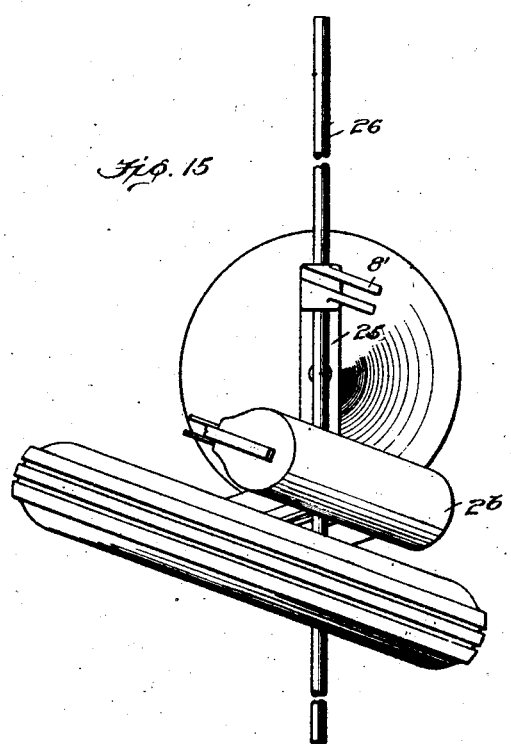
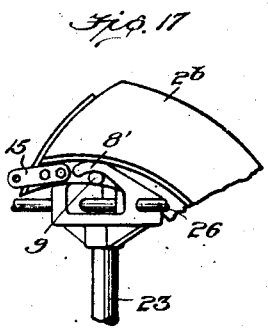
INVENTOR
Howard I. Morris
BY
ATTORNEY

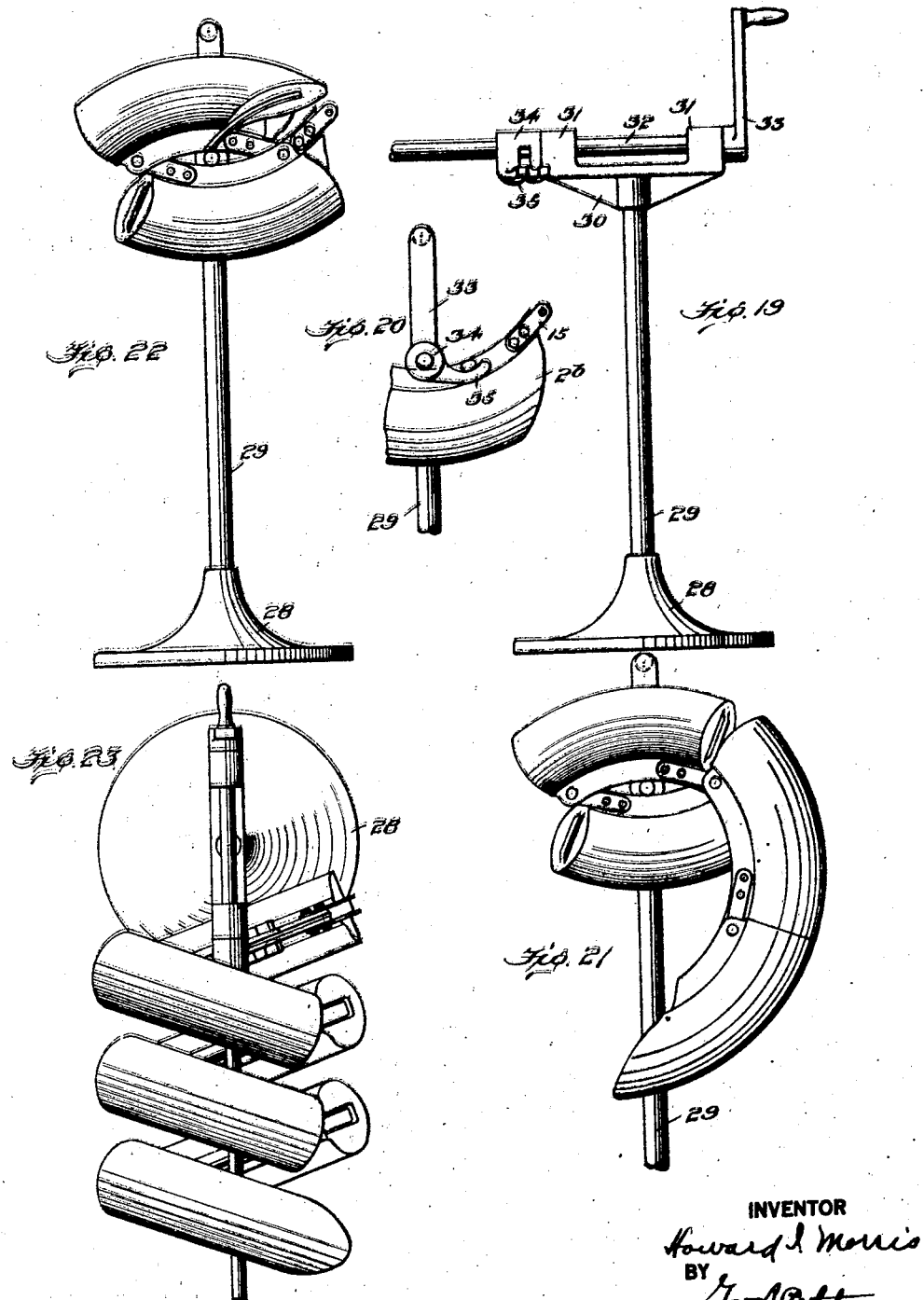

Patented Nov. 22, 1927.

1,650,147

UNITED STATES PATENT OFFICE.

HOWARD I. MORRIS, OF CLEVELAND, OHIO, ASSIGNOR TO THE YODER-MORRIS COMPANY, OF CLEVELAND, OHIO, A CORPORATION OF OHIO.

STRIPPING MACHINE.

Application filed June 9, 1924. Serial No. 718,955.

This invention relates to a forming member adapted to support a casing or carcass while it is being made or finished, either or both; that is, the member may be used in the manufacture of the carcass or to support the carcass while the operations of finishing it are being carried on. The invention also relates to the support for the forming member and process of stripping carcasses or casings from the forming member.

One object of the invention is to provide a forming member or support that is relatively light, thereby enabling such member or support with a carcass thereon to be readily handled and moved from one place to another.

Another object of the invention is to construct an improved sectional forming member, whereby a tire carcass or the finished tire may be quickly and readily stripped therefrom.

A further object of the invention is to provide a stand or a supporting device for a carcass forming member and the member or members to be supported thereon with improved interlocking means which secure one end section of each member to the stand or supporting device and thus permit the tire carcass or the finished tire and the remaining sections of the member to be moved relative to the first section and then moved relative to each other to effect removal of the carcass or tire from the member in a relatively quick manner.

Another object of the invention is to provide a core of articulate sections adapted to serve as a forming member for tire carcasses having relatively large cross sections, such as carcasses for tires of the balloon or semi-balloon type, whereby the carcasses for tires of this type or the finished tires themselves may be readily removed from the core upon which they are made.

Other objects of the invention will be apparent to those skilled in the art to which my invention relates from the following description taken in connection with the accompanying drawings.

In the following description and accompanying claims, the term "core" will comprehend a core or forming member and also a supporting member, since it may be used to support the carcass while it is being finished and is also capable of use, if desired, as a mold core. Accordingly, I do not wish to be limited in the use of such term.

Referring to the drawings, Fig. 1 is a side elevation of a sectional member or core embodying my invention, such member being shown in assembled relation and positioned upon a chuck.

Fig. 2 is a view of the member assembled upon the chuck of a finishing stand.

Fig. 3 is a section on the line 3—3 of Fig. 2.

Fig. 4 is a fragmentary view on the line 4—4 of Fig. 2.

Fig. 5 is an end view of the member when in its collapsed condition.

Fig. 6 is a plan view of the member when in its collapsed condition.

Fig. 7 is an end view of one of the sections.

Fig. 8 is a section on the line 8—8 of Fig. 2.

Fig. 9 is a transverse section through a section showing the construction thereof when its body portion is formed of sheet metal.

Fig. 10 is a transverse sectional view of a section wherein its body and neck portions are integrally formed.

Fig. 11 is a transverse section of a section having its body portion formed of wood.

Fig. 14 is an elevational view of a sectional member or core and a stand or supporting device therefor having interlocking means which support the member and removably connect it to the stand; this view showing the stripping operation further advanced as compared with Fig. 12.

Fig. 15 is a plan view of the parts shown in Fig. 14.

Fig. 16 is a plan view of the stand.

Fig. 17 is fragmentary side view of the parts shown in Fig. 16 and a core section.

Fig. 18 is a fragmentary view showing the interlocking devices which connect the forming member and stand together.

Fig. 19 is an elevation of a stripping stand slightly modified so that the sections of the core or forming member may be revolved progressively to either re-assemble the sections or to disassemble them to effect the stripping operation.

Fig. 20 is a fragmentary view showing the manner of interlocking an end section of the forming member to the revoluble member of the stand.

Fig. 21 is a fragmentary elevation of the stand shown in Fig. 19 and forming member, showing the operation of the revoluble member to collapse the sections of the latter to strip a tire casing (the latter being omitted; this view also illustrating the reverse operation of the revoluble member to re-assemble the sections in operative relation.

Fig. 22 is an elevational view of the stand and forming member after the latter has been completely collapsed and the casing stripped.

Fig. 23 is a top plan view of the parts shown in Fig. 22.

Figure 1:
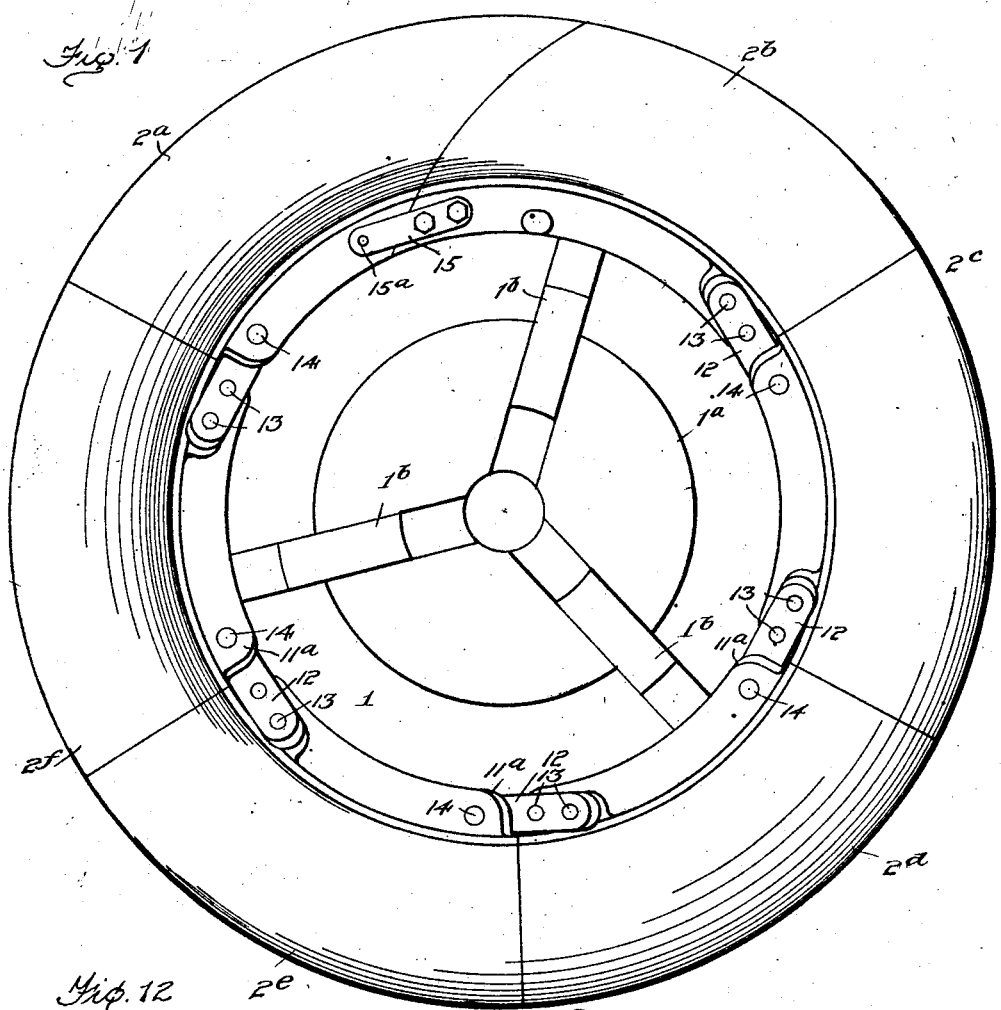

In the drawings, 1 indicates a chuck which may be of any desired construction. The chuck preferably comprises a frame $1^a$ having adjustable arms $1^b$ which are movable outwardly to engage the inner circumference of a core or forming member, indicated as an entirety at 2, to support the latter on the chuck. The chuck 1 may form part of a tire making machine and it may be rotated in either direction and at any desired speed by suitable mechanism, so that the tire carcass may be suitably formed on the core and then finished. In practice, it is customary to manufacture the tire carcass on the core while it is supported by a chuck and to then remove the core with the carcass thereon from the chuck and re-position it on a chuck while it is mounted on a finishing stand and to then finish the tire on the latter support. Following this practice, I have shown at 3, in Fig. 2, an arm which forms part of a suitable finishing stand, this arm having a shaft 4, which rotatively supports a chuck 5. It is obvious that the chuck 5 may be driven by a suitable mechanism, if desired. The chuck 5 comprises a plurality of arms 6 each of which supports an adjustable member 7, the outer ends of which detachably engage the core 2 to support it. In carrying out one object of the invention, one of the arms 7 of the chuck 5 carries an interlocking member 8, preferably provided with bifurcations $8^a$ which are adapted to be disposed on opposite sides of the neck 2' of the core and laterally extended so as to engage the inner sides of a pair of lugs 9 disposed upon and extending from the opposite sides of the neck 2'. The bifurcations $8^a$ and lugs 9 constitute interlocking means between the chuck 5 and core 2, and serve to secure one end section of the core to the chuck while the remaining sections are being moved to effect the collapsing operation and stripping or removal of the finished tire from the core.

The core 2 consists of a plurality of sections each comprising a body portion corresponding in cross section to the shape of the casing to be made on the core and a neck portion 2' extending inwardly from the inner edge of the core section. The core may be divided into as many sections as desired, but by preference it is divided into an even number of sections, six being shown in the drawings, the end sections being designated $2^a$, $2^b$, and the intermediate sections being designated $2^c$, $2^d$, $2^e$, and $2^f$. Each section preferably abuts the adjacent section on radial lines except the abutting ends of the two end sections $2^a$, $2^b$, where the collapsing operation commences to strip a casing or tire from the core or the assembly of the sections is completed prior to the mounting of the core on the chuck 1. To permit these operations the abutting ends of the end sections $2^a$, $2^b$, are curved about the axis upon which one section ($2^b$) and the adjacent section $2^c$ swing one relative to the other.

11 indicates hinged connections between the core sections, the pivots for the connections being disposed at an angle to the axis of the core, so that each section swings relative to the adjacent section in a plane at an angle thereto or to the plane of the core when all the sections are in assembled relation, the purpose of such arrangement being to effect movement of the core sections inwardly and laterally or out of the plane of the core or the plane of the casing, or finished tire supported thereby, to facilitate the stripping of the casing or tire from the core.

Figure 12:
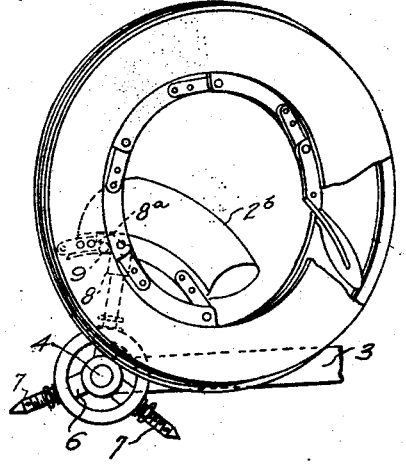
Fig. 12 is a view showing the first step in performing the process of stripping a casing from the forming member, where the end section is held stationary and the casing and remaining sections are moved relative thereto.
Figure 13:
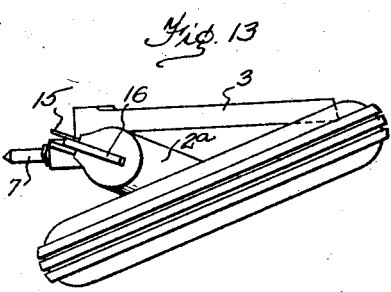
Fig. 13 is a plan view of the parts shown in Fig. 12.

The construction of my sectional forming member permits me to effect the stripping operation (1) by holding one end section stationary and bodily swinging the tire casing and remaining sections relative to said end section and then repeating this operation, in progressive order, relative to each succeeding section or (2) by revolving the end section about an axis adjacent its neck 2', the effect of which will be to progressively revolve each section, causing it to swing inwardly and the remaining outwardly disposed sections to move laterally. In carrying out the first mentioned method, the end section $2^b$ is held stationary (see Figs. 12 and 13) while the casing and remaining sections are moved about the hinge connections between the sections $2^b$, $2^c$, to strip the casing from the section $2^b$ so that in fact the casing (as well as the remaining sections in the first stripping step of my process) is moved in the angular plane relative to the section $2^b$ until the section $2^c$ is in a plane substantially parallel to the section $2^b$, looking in a direction that is substantially parallel to the axis of the casing. In the second step of my process, the section 2ᶜ remains stationary (see Figs. 14 and 15) while the casing and remaining sections swing in a plane at an angle to the section 2ᶜ about the hinged connections 11 between it and the section 2ᵈ, until the latter section assumes a substantially parallel relation to the sections 2ᵇ, 2ᶜ. These operations are continued until all the sections from the supported end section 2ᵇ to the free end section 2ᵃ, are successively stripped from the casing, Figs. 5 and 6 showing the final collapsed condition of the sections when the stripping operation has been completed.

The hinge connections 11 between each core section are provided for by bending the ends of the neck 2′ laterally in opposite directions at an angle, as shown at 11ᵃ, 11ᵃ′, so that their side walls at each end will be spaced from and disposed parallel to the bent side walls of the neck portions on the adjoining sections and interposing between the ends 11ᵃ, 11ᵃ′ a plate, one end of the latter being preferably rigidly secured to the adjacent end 11ᵃ′; (preferably by cap screws 13) and the other end of the plate being pivotally connected to the adjacent bent end 11ᵃ by pivot pin 14, which may comprise a screw the inner end of which fits a screw threaded opening in the bent end 11ᵃ. As will be understood, the plates 12 are rigidly secured and pivotally connected, respectively, to the corresponding ends of all the core sections, except the abutting ends of the neck portions 2′ connected to the end core sections 2ᵃ, 2ᵇ, which have curved abutting ends, as already described. The neck portions of these two sections are detachably connected by a plate 15 rigidly secured to one neck portion 2′ and overlapping the joint between it and the other neck portion, being connected to the latter by the pin or bolt 15ᵃ extending through openings formed in the plate and the adjacent neck portion. By preference there are two plates 15 each disposed on one side of the adjoining neck portions 2′.

16 indicates as an entirety interlocking means disposed between the abutting ends of the core sections and co-acting to prevent relative lateral movements therebetween when they are assembled in operative relationship. The interlocking means 16 preferably comprise a projecting member on one end of each section and a correspondingly shaped recess formed on the opposite end of each section, so that when the sections are assembled to form the core, the projecting member on one end fits into the recess on the abutting end of the adjacent section and thus prevents relative lateral movements between them. The projecting members and recesses are preferably elongated and extend in a radial direction relative to the axis of the core.

Fig. 9 illustrates a core, the sections of which are formed from sheet metal. In such construction each section may comprise a ring 17 having a neck portion 18 and a sheet metal section 19 shaped to form the body portion of the core sections. When the body portion is formed of sheet metal, I preferably form it from two sections, as shown. The sheet metal sections may be secured along their inner edges to the ring 17 in any suitable manner, for example by welding; their outer edges may be rolled or shaped to form a seam of any desired construction, preferably in a manner which eliminates the formation of any rib on the outer surface of the core. The end walls of each section may be provided with caps 20 suitably secured to the end edges of the sheet metal sections 19. In this form of construction, the caps 20 are shaped to provide the interlocking means 16, already described—see Fig. 8.

When the core sections are cast of metal, I prefer to make the body portion and neck portion integral and also to make the body portion hollow to insure lightness in the completed article, this construction being shown in Fig. 10. In such form of construction, the end walls of each section may be cast integrally with the body portion and neck portion, or otherwise secured thereto in position.

Fig. 11 illustrates a core section having a neck portion 21 and a body portion 22 formed from wood. Where the body portion is formed in this manner it may comprise a plurality of sections, or the body portion may be formed from laminæ.

In operation, the core sections are arranged in assembled relationship and positioned on the chuck 1. While so supported, the casing is made on the core. If the casing is to be stripped from the core, the latter may be provided with the interlocking means 8. But in ordinary practice, the core and casing are removed from the chuck 1 and positioned on the chuck 5 of the finishing stand 3, at which time the bifurcations are interengaged or interlocked with the lugs 9. Next, the finishing operations are carried out to complete the tire. To carry out this stripping or removal operation, the pin 15ᵃ is removed and then the finished tire and core sections 2ᶜ, 2ᵈ, 2ᵉ, 2ᶠ and 2ᵃ, are bodily moved about the hinge connection between the section 2ᵇ and section 2ᶜ, the former section being held on the chuck 5 by the bifurcated member 8, until the adjacent section 2ᶜ occupies a position substantially parallel to the section 2ᵇ; as this operation takes place, due to the angular arrangement of the pivot between the sections 2ᵇ, 2ᶜ, the tire and sections 2ᶜ, 2ᵈ, 2ᵉ, 2ᶠ, 2ᵃ will swing in a plane on an angle to the section 2ᵇ, and thus cause the tire to strip itself from the section 2ᵇ. Next, the finished tire and sections 2ᵈ, 2ᵉ, 2ᶠ and 2ᵃ, are swung about the pivot of the hinge connections between the section $2^c$ and the next section $2^d$ until the latter assumes a position approximately parallel to the section $2^c$; as this operation takes place, the tire and sections $2^d$, $2^e$, $2^f$, and $2^a$ swing in plane at an angle to the section $2^c$ which causes the tire to strip itself from the latter section. Next, the finished tire and sections $2^e$, $2^f$ and $2^a$, are swung about the hinge connection between the sections $2^d$ and $2^e$ until the latter section assumes a position approximately parallel to the section $2^d$; as this operation takes place, the tire and sections $2^e$, $2^f$ and $2^a$ swing at an angle to the section $2^d$, which cause the tire to strip itself from the latter section. Next, the finished tire and sections $2^f$ and $2^a$, are swung about the hinge connection between the sections $2^e$ and $2^f$, until the latter section assumes a position approximately parallel to the section $2^e$; as this operation takes place, the tire and sections $2^f$ and $2^a$ swing at an angle to the section $2^e$ and thus cause the tire to strip itself from the latter section. Next, the finished tire and section $2^a$ are swung about the hinge connection between the sections $2^f$ and $2^a$, until the latter is substantially parallel to the section $2^f$; as this operation takes place, the tire and section $2^a$ swing at an angle to the section $2^f$ and thus causes the tire to strip itself from the latter section. When this last operation is completed, the finished tire has been disengaged from all of the core sections except the last, viz, the end section $2^a$. By pressing downwardly on the finished tire it may be readily disengaged or stripped from the end section $2^a$. In stripping the tire from the core, as described, the chuck 5 is preferably disposed in a vertical position so that the operator can manipulate the tire in the manner described.

After the removal of the tire from the core sections, the latter may be swung around in the reverse direction, which movement will cause them to assume their assembled relationship and thereafter the pin $15^a$ may be replaced to hold the sections in position. The core may then be removed from the chuck 5 and repositioned on the chuck 1.

Where it is desired to remove the tire carcass from the core before it is finished into a completed tire, such removal is effected in the same manner as above described.

In stripping the tire from the core, it will be noted that one end section of the series of core sections is supported on the chuck 5 (or a stand to be later described) and then the tire and remaining sections are bodily swung about the hinge connection between such end section $2^b$ and the next section $2^c$; likewise in each succeeding operation the tire and remaining sections are similarly operated. I am thus enabled to attain relatively great leverage to effect such operations and as a result a tire of relatively large cross section, for example balloon or semi-balloon tires and other types of tires may be readily stripped.

In some instances it may be desired to remove the core and the product thereon from the chuck 1 or chuck 5 to a stripping stand or supporting device, such as shown in Figs. 14 to 16, inclusive. In these views, 23 indicates a standard having a suitable base 24. At its upper end the standard carries a bracket 25 having a pair of bifurcations 8' with which the lugs 9 are engaged in the manner already described in connection with the chuck 5.

26 indicates a rod supported at its inner end by the bracket 25 and extending substantially horizontally. The purpose of the rod 26 is two fold—first, it serves as a support for the core sections as they are successively disengaged from the tire. For this purpose the rod is arranged to engage the section $2^b$ at a point midway between the interlocking means 8 and the hinge connection between the section $2^b$ and the section $2^c$ (see Fig. 14), so that as the stripping operations take place, each alternate core section ($2^b$, $2^d$, $2^f$,—see Fig. 6) will engage with and be supported by the rod. Secondly, the rod 26 limits the swinging operation of each section relative to the previous section as the successive stripping operations are effected. The rod 26 may be removably supported in an opening 27 formed in the bracket 25. By preference, the bracket is extended in opposite directions relative to the standard 23 and provided at either end with bifurcations 8' and a rod 26 extends horizontally from either bracket so that the operation of stripping two tires can be carried on simultaneously, if desired. In the preferred form of construction, the openings 27 are aligned and a single rod extends therethrough and horizontally in opposite directions beyond the brackets 25.

It heretofore has been customary, in the use of collapsible cores either to use some form of chuck or other mechanical means to remove the core sections separately or collectively from the tire casings, or for the operator to strip the several sections by inserting his hands into the cavity of the casing and manually pulling each section therefrom. In my improved core, one of the end sections is supported or held against rotation after which the core sections are removed by simply rotating the tire casing first about said end section and then the remaining sections successively. Thus the support for one end section serves to remove that section, then that section in turn, serves to hold the second section and to remove it from the casing, and so on until all the sections are removed and the casing stripped. This process or method of removing a core from a tire casing is entirely new, so far as I am aware.

In Figs. 19 to 23 I have shown a stripping stand in which the construction is somewhat modified to enable the stripping operation and the re-assembly of the collapsed core sections to be effected by a rotatable member, which may be operated by hand (as shown) or by power; this form of mechanism being adapted to carry out the second method of operation already referred to. In this form of construction, the end section 2^b of the core is revolved about an axis, or preferably the axis of a support, while the casing is held stationary by the operative or otherwise.

In these views, 28 is a base, which supports a standard 29. At its upper end, the standard 29 carries a support 30 that is provided with spaced lugs or up-standing walls 31 formed with aligned openings which form bearings for a shaft 32. 33 indicates an element fixed to the shaft and serving as the means by which the shaft may be driven, the element in the present disclosure comprising a lever or crank. The shaft extends laterally to form a support for the core sections as they are operated to effect the stripping operation. 34 indicates a collar fixed to the shaft 32 and provided with means 35 to interlock with the end section of the core, such interlocking means preferably being similar in construction to the devices already described. The collar 34 may be fixed to the shaft by a suitable set screw and preferably in engagement with the outer end of the adjacent bearing 31 so as to co-operate with the crank 33 (which is similarly arranged with respect to the other bearing) to prevent endwise movement of the shaft 32. In operation the core, with a casing mounted thereon is placed on the support 32 with the lugs 9 thereof in engagement with the interlocking means 35. Then, while holding the casing stationary, the shaft 32 is rotated to revolve the collar 34 such operation serving to (1) revolve the end section 2^b of the core about the axis of the shaft 32 and (2) swing the end section about the hinge or pivot connections 11 between such section and the section 2^c. Due to the angular arrangement of the pivot connections 11, such operation will cause a lateral movement of the casing and remaining sections and thus result in stripping the end section from the casing. As the rotation of the shaft 32 continues, the end section will pick up the next section 2^c and cause it to move in the manner already described with respect to the section 2^b, and effect a stripping thereof from the casing. Continued rotation will effect a similar movement of each section, in progressive order, until the sections have all been collapsed and the casing stripped, as shown in Figs. 22 and 23.

To re-assemble the core sections, the shaft 32 is rotated in the opposite direction. In this operation, the outermost end section first gravitates downwardly, then the next sections follow in successive order (see Fig. 21). As this unwinding or reverse rotation operation continues, the outer end section and intermediate sections move in a circular path to assume their annular relation and in so doing the outermost sections tend to gravitate outwardly, which tendency maintains them and the succeeding or inward sections in assembled relation until all the sections are assembled and the outer end section engaged with the inner end section.

In the use of the term "forming member" in the appended claims I wish it to be understood as referring to various shaped members without restricting my invention to a core forming member or supporting member that is substantially round in cross section. Furthermore in the use of the term "casing," I wish to be understood as referring to either a carcass or a finished tire, since the latter is similar to the carcass except for the addition of the tire tread and other elements that are superimposed on the carcass. In the application of my invention, the separation or stripping operation of the sectional forming member may be effected after the carcass is made and prior to the finishing thereof, as well as after the tire has been completely finished ready for use.

To those skilled in the art of making and using forming members and cores, many changes in construction and widely differing embodiments and applications thereof will suggest themselves without departing from the spirit and scope of the invention. My disclosures and description herein are purely illustrative and are not intended to be in any sense limiting.

What I claim is:

1. A forming member for annular bodies comprising a series of sections of substantially equal length and adapted to be arranged end to end, and pivotal connections between the sections permitting said sections to swing each relative to the next section in a plane at an angle thereto successively from end to end of the series.

2. A forming member for annular bodies comprising a series of sections of substantially equal length and adapted to be arranged end to end, and pivotal connections between the sections, the pivots between adjoining sections being disposed at an angle thereto, and permitting said sections to swing each relative to the next section in a plane at an angle thereto successively from end to end of the series.

3. A forming member for annular bodies comprising a series of sections of substantially equal length having inwardly extending neck portions adapted to be arranged end to end, and pivotal connections between said neck portions permitting said sections to swing each relatively to the next section in a plane at an angle thereto successively from end to end of the series.

4. A forming member for annular bodies comprising a series of sections of substantially equal length having inwardly extending neck portions adapted to be arranged end to end, and pivotal connections between said neck portions, the pivots between adjoining neck portions being disposed at an angle thereto, and permitting the said sections to swing relative to the next section in a plane at an angle thereto successively from end to end of the series.

5. The combination of a forming member for annular bodies comprising a series of arc shaped sections of substantially equal length and having abutting ends between the sections disposed on lines radial of the sections when in assembled relation, the outer ends of the end sections of the series being respectively concave and convex to permit swinging of one end section relative to the other section, pivotal connections between said sections permitting said sections to swing each relative to the next section successively from end to end of the series, and means for supporting one end section of the series.

6. A forming member for annular bodies comprising a series of arc shaped sections of substantially equal length and having abutting ends between the sections disposed on lines radial of the sections when in assembled relationship, the outer ends of the end sections of the series being respectively concave and convex to permit swinging of one end section relative to the other section, and pivotal connections between said sections permitting said sections to swing each relative to the next section in a plane at an angle thereto successively from end to end of the series.

7. The combination of a forming member for annular bodies comprising a series of arc shaped sections and having abutting ends between the sections disposed on lines radial of the sections when in assembled relationship, the outer ends of the end sections of the series being respectively concave and convex to permit swinging of one end section relative to the other section, pivotal connections between said sections permitting each section to swing relative to the adjoining section in a plane at an angle thereto, a detachable connection between said end sections, and means for supporting one end section of the series.

8. A forming member for annular bodies comprising a series of arc shaped sections having abutting ends between the sections disposed on lines radial of the sections when in assembled relationship and inwardly extending neck portions, the outer ends of the end sections of the series being respectively concave and convex to permit swinging of one end section relative to the other section, pivotal connections between said neck portions disposed inwardly of their inner edges, permitting each section to swing relative to the adjoining section in a plane at an angle thereto, and a detachable connection between the neck portions of said end sections.

9. The combination of a forming member for annular bodies comprising a series of sections adapted to be arranged end to end, pivotal connections between the sections permitting said sections to swing each relative to the next section in a plane at an angle thereto successively from end to end of the series, and means for supporting one section of the series while the remaining sections are being operated.

10. The combination of a forming member for a body comprising a series of sections of substantially equal length and adapted to be arranged end to end, and pivotal connections between the sections permitting each section of the series to swing relative to the next section in a plane at an angle thereto, and means for supporting one end section whereby the body together with successive remaining sections of said member may be operated about the pivot connections between each succeeding section and the next section until the body is stripped from all of said sections.

11. In a stripping mechanism, the combination with a support, of a forming member for annular bodies comprising a series of sections adapted to be arranged end to end, pivotal connections between the sections permitting each section of the series to swing relative to the next section in a plane at an angle thereto, and interlocking means between said support and one end section of the series operating to hold said section while the annular body and remaining sections are folded relative thereto and each remaining section in progressive order until the opposite end section is reached.

12. The combination of a forming member for bodies comprising a series of sections adapted to be arranged end to end, pivotal connections between the sections permitting each section of the series to swing relative to the next section in a plane at an angle thereto, means for supporting one end section of the series while the remaining sections are being operated, and means for limiting the movements of the sections relative to each other.

13. The combination of a forming member for annular bodies comprising a series of sections adapted to be arranged end to end, pivotal connections between the sections permitting each section of the series to swing relative to the next section in a plane at an angle thereto, means for supporting one end section while the sections are being operated, and means disposed in the path of movement of certain of the remaining sections for supporting them during the stripping operation.

14. The combination of a forming member for annular bodies comprising a series of sections adapted to be arranged end to end, pivotal connections between the sections permitting each section of the series to swing relative to the next section in a plane at an angle thereto, means for supporting one end section of the series while the remaining sections are being operated, and means for limiting the movements of the sections relative to each other and for supporting certain of them during the stripping operation.

15. The combination of a forming member for bodies comprising a series of sections adapted to be arranged end to end and pivotal connections between the sections permitting each section of the series to swing relative to the next section in a plane at an angle thereto, and means for removably supporting one end section of the series while the remaining sections are being operated.

16. In a tire support, the combination of supporting means having a projecting member, a forming member for bodies removably engaging said supporting means and comprising a series of sections adapted to be arranged end to end, pivotal connections between the sections permitting each section of the series to swing relative to the next section in a plane at an angle thereto, and a device on one end section of said forming member removably engaging said projecting member.

17. In a tire support, the combination of supporting means having a pair of projecting members, a forming member for bodies comprising a series of sections adapted to be arranged end to end and pivotal connections between the sections permitting each section of the series to swing relative to the next section in a plane at an angle thereto, and a bifurcated device on one section of said member removably engaging said projecting members to hold said end section.

18. A forming member for annular bodies comprising a series of curved sections each comprising a body portion and a neck portion, the opposite ends of the neck portions being bent at an angle to the plane thereof and disposed in planes parallel to each other, and pivotal connections between the bent ends of adjoining sections.

19. A forming member for annular bodies comprising a series of curved sections each comprising a body portion and a neck portion, the opposite ends of the neck portions being bent at an angle to the plane thereof and disposed in planes parallel to each other, and pivotal connections between the bent ends of adjoining sections, each said pivotal connection comprising a plate disposed between the opposing faces of the bent ends and bridging the joint between the adjacent neck portions and a pivot between said plate and one of said bent ends.

20. In apparatus of the class described, the combination of a supporting means having an attaching device, a core comprising sections having hinged connections between the abutting ends thereof, and means carried by one end section of the core removably engaging said device, said device operating to hold the end section while the casing and remaining sections swing relative to said end section and also operates through said end section to hold the succeeding sections stationary progressively while the casing and remaining sections swing relative to said sections successively.

21. A collapsible core comprising a series of sections of equal length having angularly arranged hinged connections between them and permitting their collapsing into angular relations, and means engaging one end section to support it while bodily movement of the remaining sections takes place to strip a casing from said end section.

22. In a tire support, the combination of a chuck having a projecting member, a forming member for bodies removably engaging said chuck and comprising a series of sections adapted to be arranged end to end, pivotal connections between the sections permitting each section of the series to swing relative to the next section in a plane at an angle thereto, and a device on one end section of said forming member removably engaging said projecting member.

In testimony whereof, I have hereunto subscribed my name.

HOWARD I. MORRIS.